United States Patent
Ishigaki

(10) Patent No.: US 6,634,508 B1
(45) Date of Patent: Oct. 21, 2003

(54) SCREW PRESS

(75) Inventor: Eiichi Ishigaki, Kagawa (JP)

(73) Assignee: Ishigaki Company Limited, Tokyo (JP)

( * ) Notice: Subject to any disclaimer, the term of this patent is extended or adjusted under 35 U.S.C. 154(b) by 108 days.

(21) Appl. No.: 09/868,635

(22) PCT Filed: Nov. 8, 2000

(86) PCT No.: PCT/JP00/07822

§ 371 (c)(1), (2), (4) Date: Jun. 27, 2001

(87) PCT Pub. No.: WO01/34374

PCT Pub. Date: May 17, 2001

(30) Foreign Application Priority Data

Nov. 9, 1999 (JP) ........................... P11-317957

(51) Int. Cl.$^7$ ........................... B30B 9/14; B01D 33/11; B01D 33/46
(52) U.S. Cl. ................... 210/415; 210/396; 210/403; 210/414; 100/117
(58) Field of Search ................... 210/414, 415, 210/396, 402, 403; 100/117

(56) References Cited

U.S. PATENT DOCUMENTS

| | | | |
|---|---|---|---|
| 2,701,518 A | | 2/1955 | McDonald |
| 4,117,776 A | * | 10/1978 | Hunt |
| 4,150,617 A | * | 4/1979 | Schramm et al. |
| 4,155,299 A | * | 5/1979 | Tuttle |
| 4,397,230 A | * | 8/1983 | Hunt et al. |
| 4,844,799 A | | 7/1989 | Lee |
| 4,901,635 A | * | 2/1990 | Williams |
| 4,997,578 A | * | 3/1991 | Berggren |
| 5,526,740 A | | 6/1996 | Lee |

FOREIGN PATENT DOCUMENTS

| | | |
|---|---|---|
| DE | 2450278 | 3/1976 |
| EP | 0395044 | 10/1990 |
| EP | 0549092 | 6/1993 |
| FR | 2567038 | 1/1986 |
| JP | 3-78123 | 4/1986 |
| JP | 03-254394 | * 11/1991 |
| JP | 04-105795 | * 4/1992 |
| JP | 04-118198 | * 4/1992 |
| JP | 04-157094 | * 5/1992 |
| JP | 08-001389 | * 1/1996 |
| JP | 08-057692 | * 3/1996 |

* cited by examiner

Primary Examiner—Thomas M. Lithgow
(74) Attorney, Agent, or Firm—Greenblum & Bernstein, P.L.C.

(57) ABSTRACT

In a screw press, an outer tube (5), over which a screen (4) is tensioned, is divided into a freely rotatable condensing zone at the front half thereof, and a filtering and dewatering zone at the rear half thereof, a freely rotatable screw shaft (7) is provided within the thus-divided outer tube (5a, 5b), filtered fluid is separated from sludge supplied to the starting end of the condensing zone by the screen (4) of the outer tube (5a), and a cake is removed at a discharge port (29) at the rear end of the outer tube (5b) of the filtering and dewatering zone. A sludge supply path (28) is provided in the screw shaft (7), a supply hole (28a) of this supply path (28) is formed at the starting end of the outer tube (5a) of the condensing zone, and a scraper (33) extends on the outer periphery of a screw vane (6) from the starting end to the ending end. The scraper (33) is caused to make pressured sliding contact with the inner peripheral surface of the outer tube (5a), so that filtering and dewatering are performed as the outer tube (5a) of the condensing zone and the screw shaft (7) are rotated.

11 Claims, 7 Drawing Sheets

SCREW PRESS

TECHNICAL FIELD

The present invention relates to a screw press for performing filtering and dewatering while causing an outer tube in a condensing zone to rotate, and more particularly, to a screw press capable of preventing screen clogging, even with a sludge of low concentration having a water load higher than a solids load.

BACKGROUND ART

In the past, a high polymer coagulant has been added to an organic sludge from sewerage, excrement, or waste water from food product processing so as to cause the formation of flock. For organic sludge having a low concentration, the method of using a centrifugal condenser or a floatation condenser for condensing, and performing filtering and dewatering was adopted, these condensing apparatuses raising the concentration of sludge, for example, from 1% to 4 to 5%, the sludge of this concentration being filtered and dewatered by a screw press. Those apparatuses all occupy a large installation area, and involve a high cost for drive power and high polymer coagulant, in addition to being troublesome to maintain and control. Although it is not a condensing apparatus, there is a known screw press as an apparatus for filtering and dewatering in the Japanese Patent Publication No. 3-78123, in which a filtering tube is divided at its middle into a sludge intake side and a discharge side, having a narrowed pitch for a screw vane at the sludge intake side, and the filtering tube at the sludge intake side is rotated at a speed slower than the rotational speed of a feed screw to thereby filter and dewater the sludge, while injecting a high-pressure fluid from outside the tube, thereby cleansing a caked layer attached to minute holes in the tube, so that a continuous filtering and dewatering effect is maintained.

Because the concentration of the sludge at the sludge intake side of the screw press is low, at an outer tube screen in the condensing zone the water load is greater than the solids load, making it necessary to discharge a large amount of water at the outer tube screen. The screw press operates at a low speed, and in a small screw press having an outer tube with a diameter of 200 mm, the rotational speed is as slow as 1 rpm to 1.5 rpm, and in a screw press having an outer tube with a diameter of 800 mm, the rotational speed is 0.03 rpm to 0.14 rpm. In currently used screw presses, the rotational speed of large-diameter screw presses is from $\frac{1}{30}$ to $\frac{1}{10}$ that of a small-diameter screw press, and the effectiveness of the scraping of the inner peripheral surface of the outer tube by the screw vane in preventing clogging in a large-diameter screw press is no more than $\frac{1}{10}$ that of a small-diameter screw press.

In particular, a high polymer thin film is formed by the high polymer coagulant, and in the condensing zone residue tends to become attached to the screen, thereby causing clogging, although in a screw press in which the filtering and dewatering tube at the sludge intake end is forcibly rotated, it is possible to achieve the effect of preventing screen clogging by injecting cleaning water continuously as the outer tube is rotated. However, the injected water passes through minute holes in the screen and enters within the outer tube, thereby diluting the concentrated sludge, thereby risking a halving of the effectiveness in concentration of the sludge. Additionally, because cleaning is performed continuously, a large amount of cleaning water is required.

DISCLOSURE OF THE INVENTION

Accordingly, it is an object of the present invention to provide a screw press, applying prior art for filtering and dewatering while causing a filtering tube to rotate at the sludge intake end of the screw press, with the sludge intake side of the filtering tube serving as a condensing zone, preventing clogging of an outer tube screen and enabling concentration, filtering, and dewatering of even an organic sludge that has been coagulated by a high polymer coagulant, and which has a low concentration.

The essence of the present invention is a screw press in which an outer tube, over which a screen is tensioned, is divided into a freely rotatable condensing zone at a front half thereof, and a filtering and dewatering zone at a rear half thereof, a freely rotatable screw shaft is provided within the divided outer tube, filtered fluid is separated from sludge supplied to a starting end of the condensing zone by the screen of the outer tube, and a cake is removed at a discharge port at a rear end of the outer tube of the filtering and dewatering zone. In this screw press, a sludge supply path is provided in the screw shaft, a supply hole of this supply path is formed at the starting end of the outer tube of the condensing zone, and a scraper extending on the outer periphery of the screw vane from the starting end to the ending end, this scraper being caused to make pressured sliding contact with the inner peripheral surface of the outer tube, so that filtering and dewatering are performed as the outer tube of the condensing zone and the screw shaft are rotated.

By forming the sludge supply hole in the screw shaft, sludge is supplied without being affected by the rotation of the screw vane, without flock that is formed by coagulating action of a coagulant being broken up, and without a loss of dewatering capability.

Because the filtering fluid is separated from the outer tube and a cake layer that is captured in the minute holes of the screen is continuously scraped away by the scraper, clogging of the screen is prevented over the entire region, from the upstream region to the downstream region of the condensing zone, so that even in the case of low-concentration sludge having a high water load, it is possible to discharge a large amount of filtered fluid from the screen of the outer tube of the condensing zone, without clogging thereof.

The screw vane winding around the screw shaft has a pitch in the condensing zone that is narrower than the screw vane pitch in the filtering and dewatering zone, and if the outer tube is caused to rotate so that a balance is maintained in the supply of sludge from the condensing zone to the filtering and dewatering zone, the number of times the scraper comes into sliding contact with the screw is increased, filtered fluid being separated from the screen, in which clogging is prevented, enabling movement of a high-concentration sludge to the filtering and dewatering zone, thereby increasing the sludge processing capacity.

If a screw vane having a single pitch is wound around the screw shaft and a screw vane is multiply wound around the screw shaft in the condensing zone, the number of scraper contacts with the screen increases in proportion to the number of screw vanes, thereby restoring the screen surface.

If the outer tube of the condensing zone is caused to rotate in a direction opposite from the screw shaft, the relative rotational speed of the condensing zone with respect to the screw shaft rotational speed is increased, thereby increasing the number of times that the scraper provided on the screw vane makes sliding contact with the outer tube screen, so as to prevent clogging of the screen.

If screw vanes are multiply wound around the screw shaft of the condensing zone, the condensing zone outer tube and screw shaft are caused to rotate in one and the same direction, and the relative rotational speed with respect to the screw shaft of the outer tube of the condensing zone is made higher than the rotational speed of the screw shaft, the sludge is moved while being concentrated by the action of the rotation of the outer tube and the insertion pressure, and the number of times the scraper comes into sliding contact with the screen is increased.

By providing a plurality of screens on the outer tube in the filtering and dewatering zone and step-wise reducing the size of the minute holes in the screen tensioned on the condensing zone and a dewatering zone screen proceeding from upstream region to the downstream region, as the pressure applied to the sludge increases, only the filtered fluid is discharged, without the sludge flowing out from the minute holes, thereby improving the ability to reclaim the cake.

If the outer tube in the condensing zone and the filtering and dewatering zone is formed cylindrically, with a screw shaft provided therewithin having a diameter of which increased in a tapered manner, proceeding from the upstream region toward the downstream region, or if the diameter of the outer tube in the condensing zone and the filtering and dewatering zone is caused to be reduced, proceeding from the upstream region toward the downstream zone, a screw shaft being provided within this outer tube, the spacing between the outer tube and the screw shaft is relatively reduced in the direction of cake discharge, so that sludge from which filtered water is separated in the condensing zone is gradually dewatered in the outer tube in the filtering and dewatering zone, thereby enabling a high degree of dewatering of solids.

If the outer tube in the condensing zone and the filtering and dewatering zone is formed cylindrically, and a condensing zone cylindrical screw and filtering and dewatering zone screw shaft having a tapered diameter increasing from the upstream region towards the downstream region are linked within the outer tube, the filtering surface area of the condensing zone is increased, thereby achieving suitability for sludge having a low concentration.

If the outer tube in the condensing zone and filtering and dewatering zone is formed cylindrically, and a screw shaft is provided therein coaxial to the outer tube, use is also possible as a thickener, with an increased processing capacity and a reduced cost of fabrication.

BEST MODE FOR CARRYING OUT THE INVENTION

By adopting the above-noted constitution, in the present invention, when organic sludge such as sewerage, coagulation by the addition thereto, is pressure-fed to a supply tube of the screw press, the sludge is supplied from the supply path of the screw shaft at the starting end of the outer tube to between the screw vane in the condensing zone, so that soft flock in the sludge flows into the outer tube without being affected by the screw vane or being broken up.

The sludge supplied to the condensing zone becomes concentrated by the discharge of the filtered fluid therefrom from the screen of the outer tube. At the same time, although a cake layer forms on the surface of the screen by the capturing of solids onto the screen of the outer tube, because the number of times the scraper makes sliding contact with the screen is increased, the cake layer deposited onto the screen surface is scraped away, thereby renewing the filter surface, so that a large amount of filtered fluid is separated from the screen of the outer tube in the condensing zone. Because the scraper acts to prevent screen clogging beforehand as the screw vane moves the sludge, it is possible to concentrate even a low-concentration sludge having a large water load.

Next, the concentrated sludge is moved to the filtering and dewatering zone, pressure being imparted to the sludge by the screw vane in the rear part as more filtered fluid is discharged from the screen of the outer tube, so as to perform filtering and dewatering and enable removal of a dewatered cake from a discharge port of the screw press.

The present invention concentrates the sludge supplied from the condensing zone to the filtering and dewatering zone with improved efficiency, and increases the amount of concentrated sludge supplied to the filtering and dewatering zone, thereby increasing the cake processing capacity of the screw press.

Figure 1:
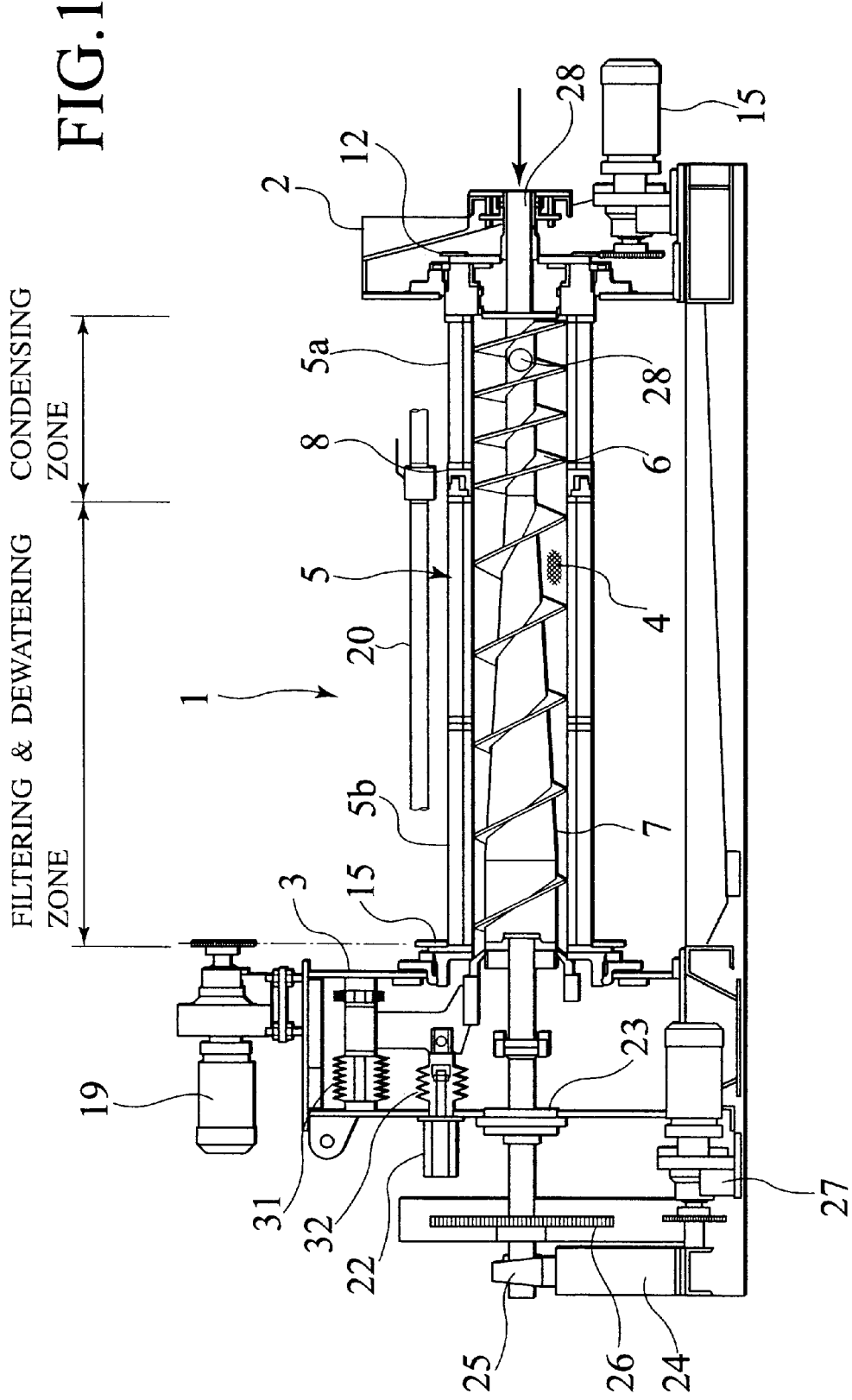
FIG. 1 is a partially vertically cutaway side elevation of a screw press according to the present invention.

Referring to the accompanying drawings, which illustrate an embodiment of the present invention, FIG. 1 is a partially cutaway side elevation of a screw press, in which a screw press 1 is supported by frames 2 and 3 at the front and rear, a screw shaft 7 around which is wound a screw vane 6 being disposed within an outer tube 5 around the peripheral part of which is provided a screen 4.

Figure 2:
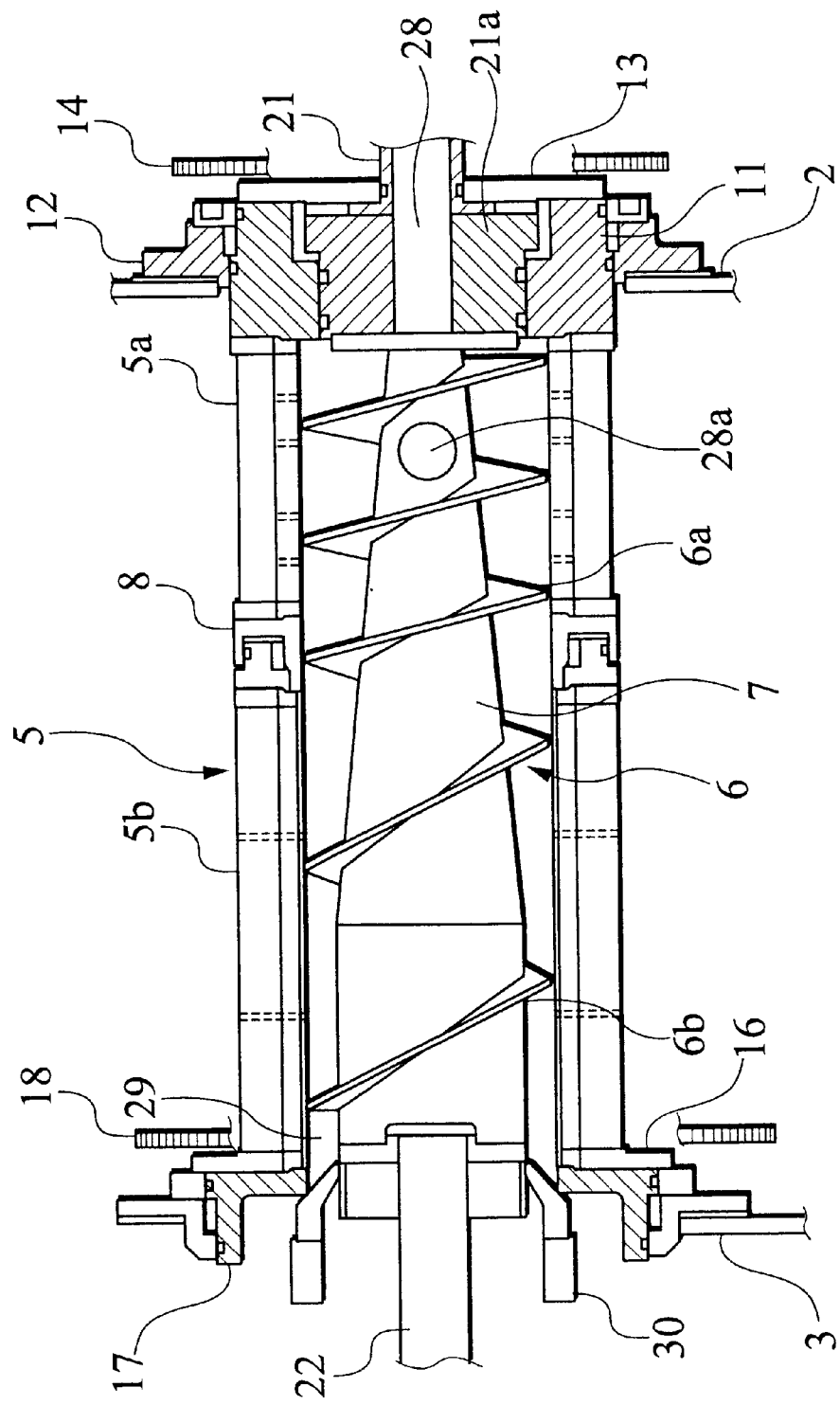
FIG. 2 is a partially vertically cutaway side elevation showing the main part of a screw press according to the present invention.

FIG. 2 is a vertical cross-sectional view of the main part of the screw press 1, in which the cylindrical outer tube 5 is divided into a condensing zone outer tube 5a at the front half, and a filtering and a dewatering zone outer tube 5b at the rear half, a bearing 8 being inserted between the condensing zone outer tube 5a and the dewatering zone outer tube 5b.

Figure 3:
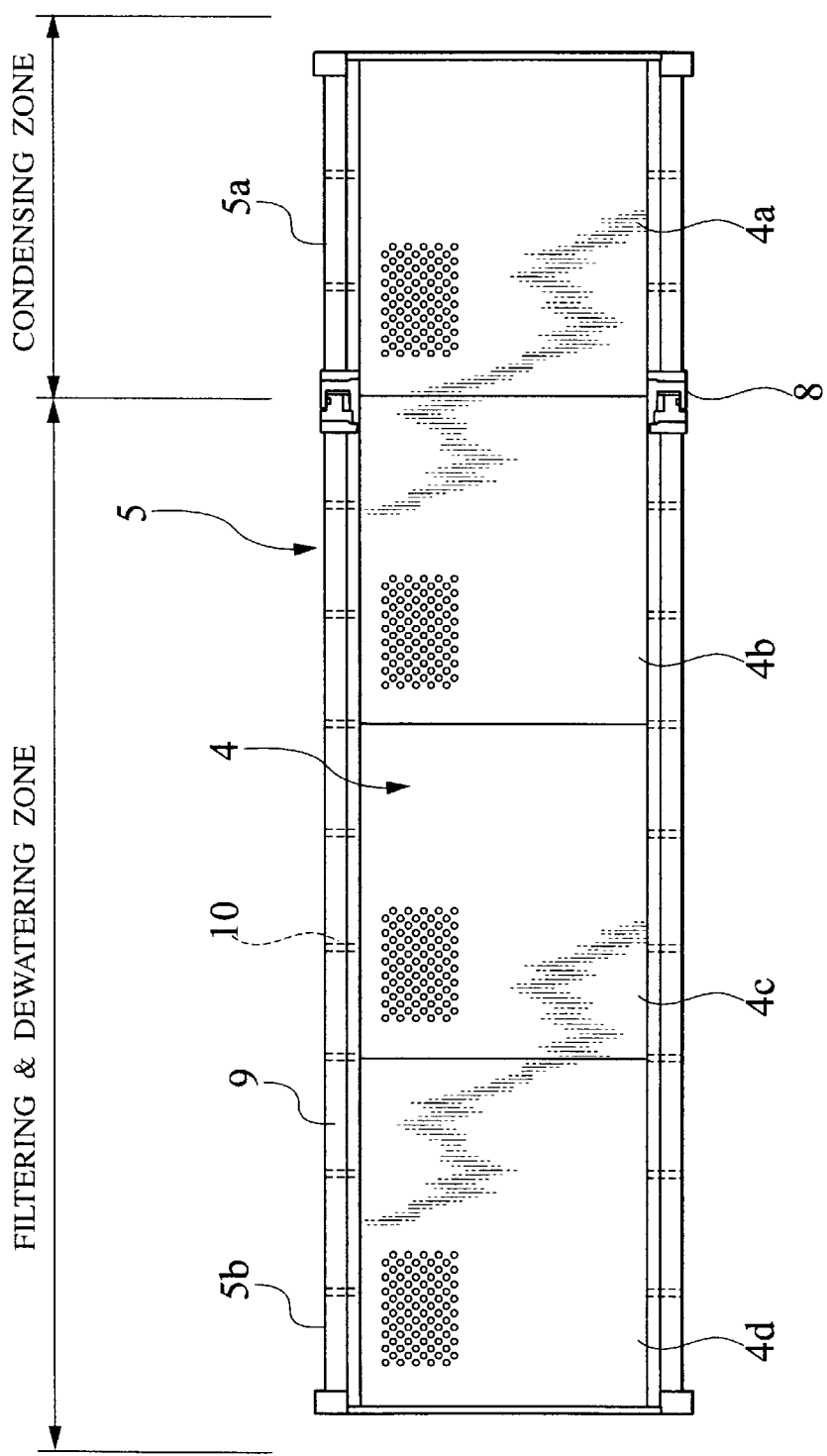
FIG. 3 is a vertical cross-sectional view of an outer tube onto which is tensioned a screen in the present invention.

Referring to FIG. 3, which shows the outer tube 5, the screen 4 is applied to the inner peripheral surface of a punched plate 9 wound around the periphery of the outer tube 5, and in this embodiment of the present invention, a screen 4a, having minute holes of diameter 1.5 mm is applied to the condensing zone outer tube 5a, and a screen 4b, having minute holes with diameters of 1.5 mm, 1.0 mm, and 0.5 mm, decreasing in the rearward direction, is applied to the filtering and dewatering zone outer tube 5b. Annular reinforcing ribs 10 is are attached to the periphery of the punched plate 9.

As shown in FIG. 2, a flange 11 is linked to the starting end of the condensing zone outer tube 5a, this flange 11 being rotatably supported by a rotating plate bearing 12, which is fixed to the frame 2. A sprocket 14 is fitted to a thrust bearing 13 linked to the end face of the flange 11, this sprocket 14 being linked to a forward/reverse driver 15 shown in FIG. 1, so that the condensing zone outer tube 5a can be rotated in the forward and reverse directions.

As shown in FIG. 2, a rotating plate 16 is linked to the rear end of the filtering and dewatering zone outer tube 5b of the outer tube 5, this rotating plate 16 being rotatably supported by a rotating plate bearing 17 fixed to the frame 3. A sprocket 18 linked to the rotating plate 16 is linked to and moves in concert with a driver 19, shown in FIG. 1, and when cleaning water is injected toward the screen 4 from a cleaning water tube 20 provided along the outer tube 5, the filtering and dewatering zone outer tube 5b and condensing zone outer tube 5b are rotated in unison as cleaning is performed.

As shown in FIG. 2, a supply tube 21 is linked to the screw shaft 7 provided within the outer tube 5, a bearing part 21a of the supply tube 21 being rotatably supported by the inner peripheral surface of the flange 11 that is fitted to the condensing zone outer tube 5a.

As shown in FIG. 1, a drive shaft 22 linked to the rear end part of the screw shaft 7 is rotatably supported by a bearing unit 23, which is fixed to the frame 3, and a bearing unit 25, which rests on the stand 24 of the screw shaft 7. A sprocket 26 linked to the drive shaft 22 is linked to a rotational driver 27, so as to cause rotation of the screw shaft 7.

As shown in FIG. 2, a sludge supply path 28 is provided in the supply tube 21 linked to the from end part of the screw shaft 7, this supply path 28 communicating with the inner part of the screw shaft 7, a supply hole 28 of the screw shaft 7 being opened toward the starting end part of the outer tube 5. Sludge that is pressure-fed into the outer tube 5 is supplied between the screw vane 6 wound around the screw shaft 7, so that soft coagulated sludge is not affected by the screw vane 6. A presser 30 is provided in opposition to the discharge port 29 at the ending end of the outer tube 5, this presser 30 being suspended from a moving shaft 31, so that an air cylinder 32 linked to the rear end of the presser 30 imparts back pressure to the cake as the degree of opening of the discharge port 29 is adjusted.

Figure 4:
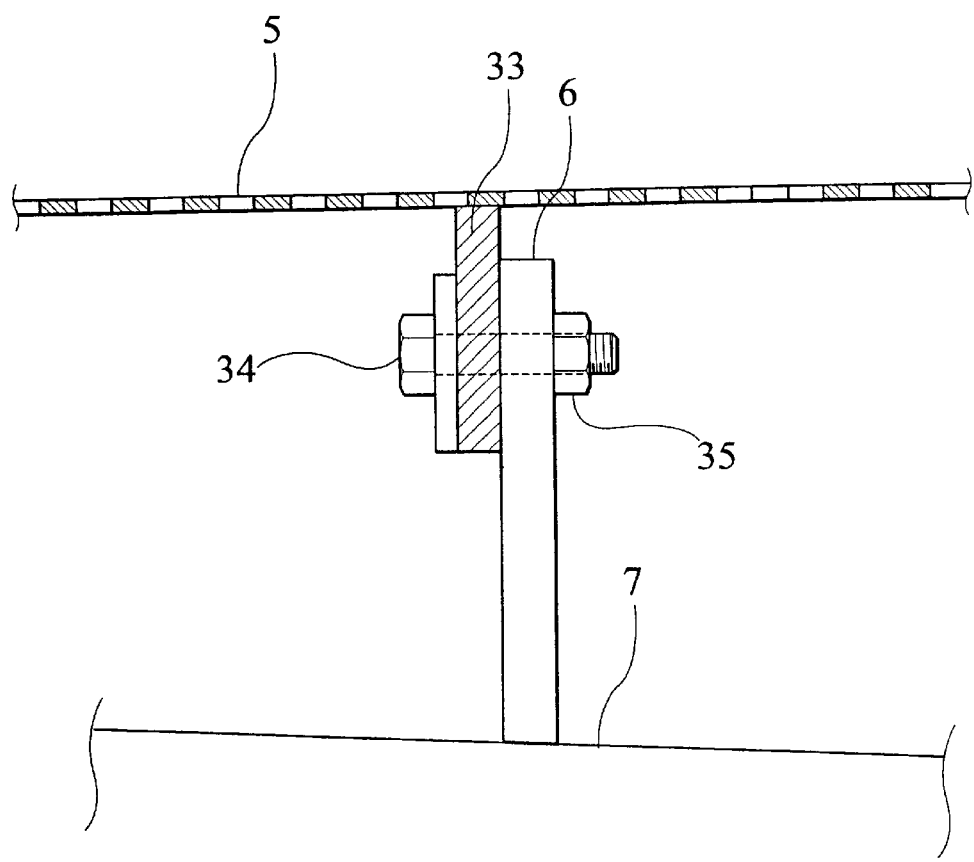
FIG. 4 is a partially vertically cutaway side elevation of a scraper mounted to a screw vane in the present invention.

On the end part of the screw vane 6, which is spirally wound around the screw shaft 7, are provided a series of elastic scrapers 33, made of rubber or the like, such as shown in FIG. 4, these being held in place by a bolt 34 and a nut 35 from the starting end of the screw vane 6 condensing zone to the ending end of the filtering and dewatering zone. These scrapers 33 are brought into pressurized sliding contact with the inner peripheral surface of the outer tube 5, filtered fluid being separated from the condensing zone screen 4a, the clogging of which is prevented by the scrapers 33, thereby increasing the amount of sludge supplied to the condensing zone, removing the cake layer on the minute holes of the filtering and dewatering zone screens 4b, 4c, and 4d, and achieving a high degree of dewatering.

In the embodiment shown in FIG. 2, the screw vane 6 wound around the screw shaft 7 has a screw vane 6a provided inside the condensing zone outer tube 5a, which has a pitch spacing that is ½ that of the dewatering zone screw vane 6b, and this pitch can be made ⅓ of the dewatering zone screw vane 6b pitch.

In a screw press in which the pitch of the condensing zone screw vane 6a is made narrower than the pitch of the said 6b in the filtering and dewatering zone, the condensing zone outer tube 5a is rotated in a direction opposite that of the screw shaft 7, and in the case in which the screw vane 6a pitch is ½, if the rotational speed of the condensing zone outer tube 5a relative to the rotational speed of the screw shaft 7 is made 2.0 to 2.5, and in the case in which the screw vane 6a pitch is ⅓, if the rotational speed of the condensing zone outer tube 5a relative to the rotational speed of the screw shaft 7 is made 3.0 to 3.5, a balanced supply of concentrated sludge is made from the condensing zone to the dewatering zone. The scrapers 33 provided on the screw vane 6a make an increased number of sliding contacts with the screen 4a of the outer tube, thereby preventing clogging of the screen 4a.

Figure 5:
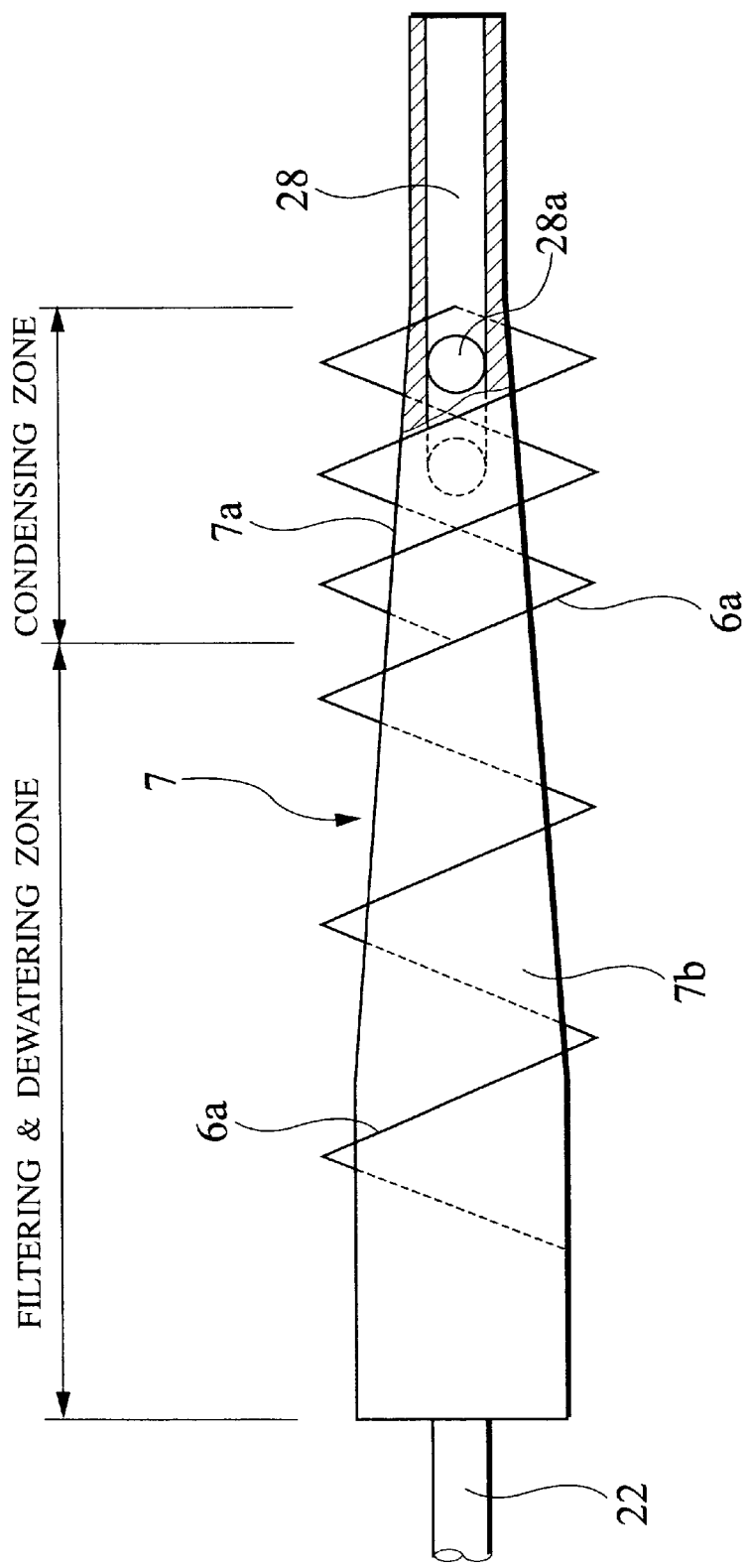
FIG. 5 is a simplified side elevation of another embodiment of a screw shaft around which is wound a screw vane in the present invention.

FIG. 5 shows an embodiment of the present invention in which the screw vane 6a in the condensing zone is doubly wound around the screw shaft 7, wherein the number of sliding contacts made by the scrapers 33 onto the screen 4a is doubled, the number of sliding contacts made by the scrapers 33 with the screen 4a increasing proportionately with the number of vanes, and the number of screw vanes 6a can also be made 3.

In a screw press in which a screw vanes 6a are multiply wound around the screw shaft 7 in the condensing zone, if the condensing zone outer tube 5a is rotated in a direction opposite that of the screw shaft 7, and the rotational speed of the condensing zone outer tube 5a relative to the screw shaft 7 is made 0.5, for example, a balanced supply of concentrated sludge is made from the condensing zone to the dewatering zone. In the case in which the condensing zone outer tube 5a rotates in the same direction as the screw shaft 7, although the feeding force of the screw vane 6a is reduced, sludge is pressure-fed to the condensing zone by insertion pressure of 0.1 to 0.5 kgF/cm$^2$, so that if the relative rotational speed of the outer tube 5a is made 1.0 to 1.5, a balanced supply of sludge is maintained.

In the embodiment shown in FIG. 2, the condensing zone outer tube 5a and the filtering and dewatering zone outer tube 5b are formed as a continuous cylindrical outer tube 5, a screw shaft 7 having a tapered diameter increasing from the upstream region toward the downstream region being disposed within this outer tube 5, so that the spacing between the outer tube 5 ad the screw shaft 7 decreases toward the ending end thereof.

Figure 6:
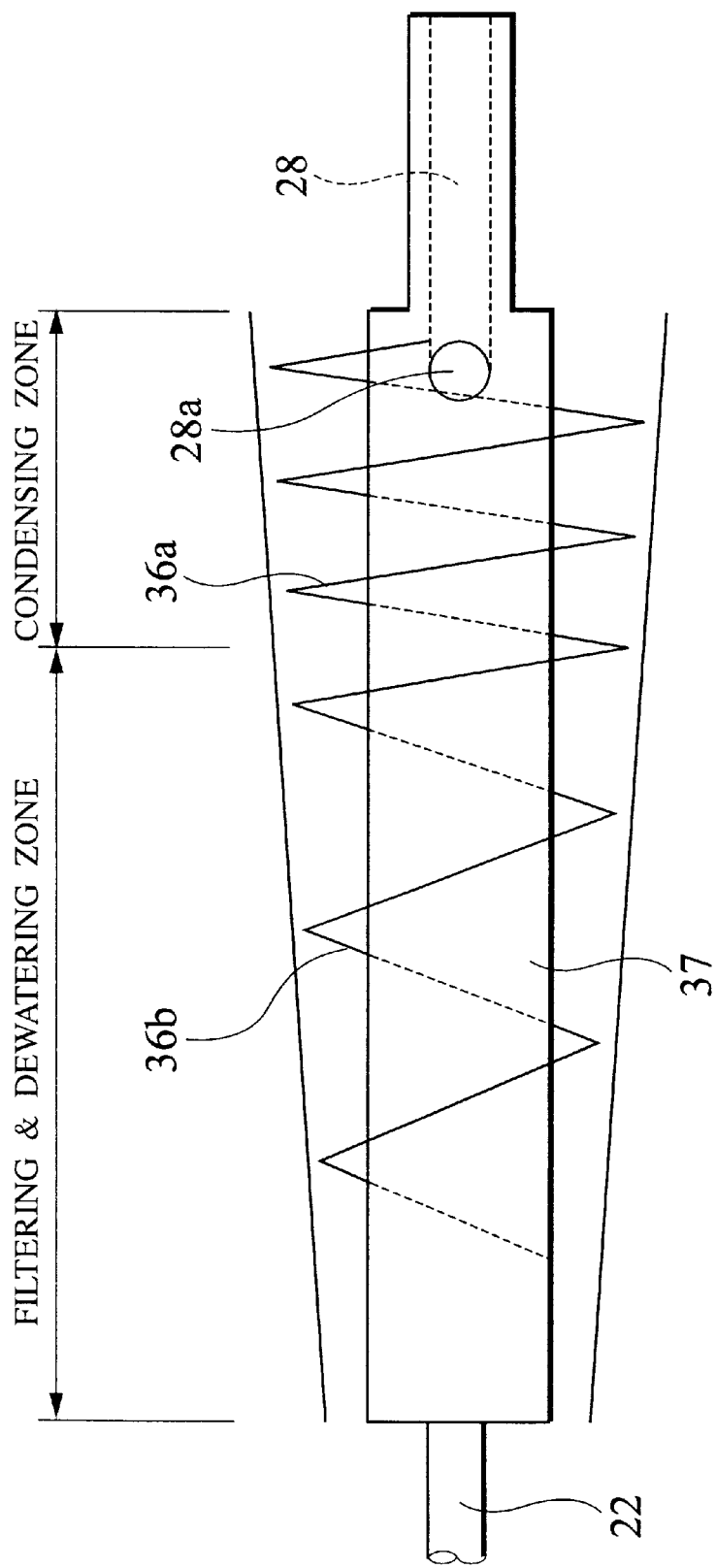
FIG. 6 is a simplified side elevation of another embodiment of a screw shaft in the present invention.

It is alternately possible to form the condensing zone outer tube 5a and the filtering and dewatering zone outer tube 5b so as to be tapered, with the diameter thereof decreasing from the upstream region toward the downstream region, and, as shown in FIG. 6, to provide a cylindrical screw shaft 37 around which is wound a screw vane 36 inside the outer tube 5, so that the relative spacing is decreases toward the ending end. In this embodiment, the screw vane 36a in the condensing zone is wound around the screw shaft 7 with a pitch spacing that is ½ of the pitch of the screw vane 36b in the dewatering zone.

Figure 7:
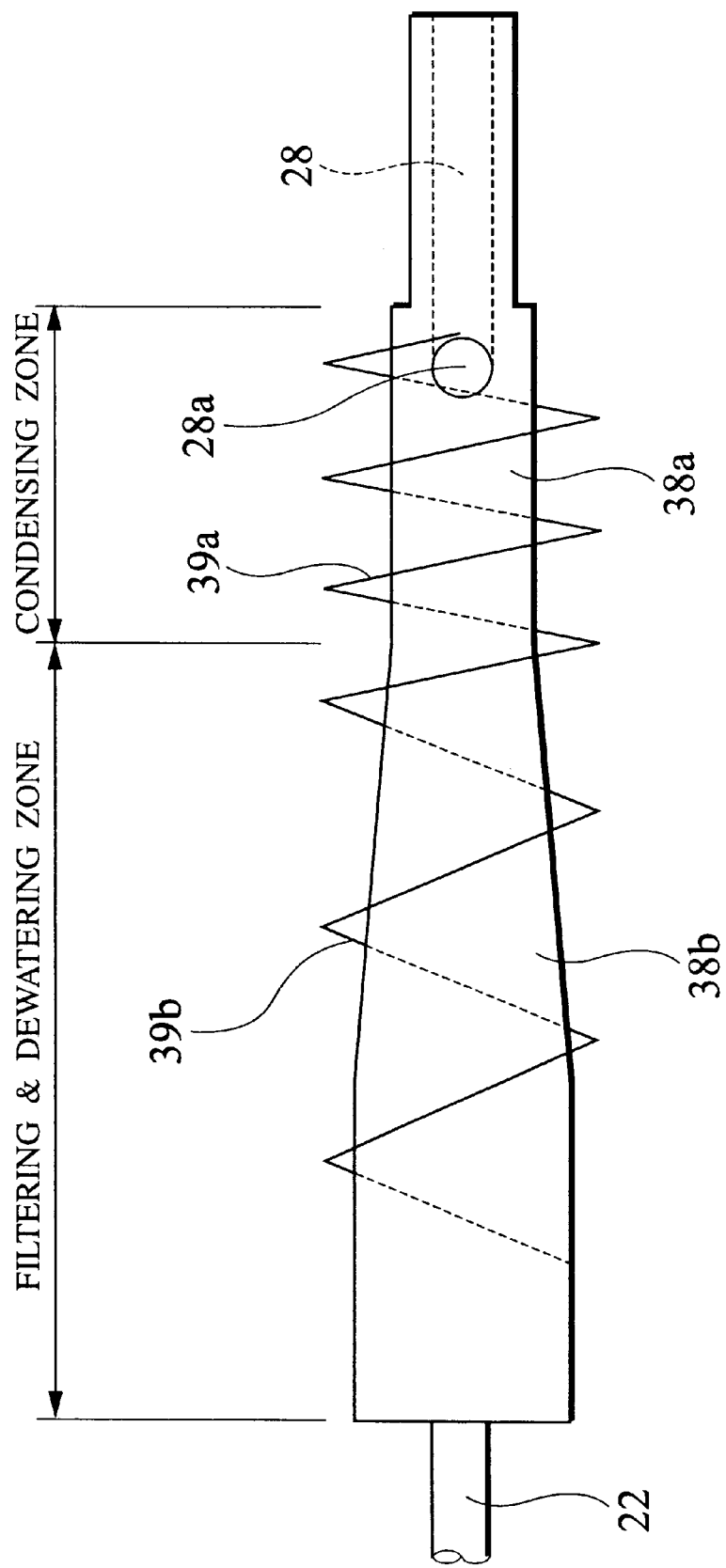
FIG. 7 is a simplified side elevation of another embodiment of a screw shaft in the present invention.

If the condensing zone and dewatering zone outer tubes 5a and 5b are formed cylindrically, and, as shown in FIG. 7, a cylindrical screw shaft 38a in the condensing zone and a tapered screw shaft 38b having diameter increasing from the upstream region toward the downstream region are linked within the outer tube 5, the capacity of the condensing zone is increased, making the screw press suitable for use with low-concentration sludge. In this embodiment as well, the condensing zone screw vane 39a is wound around the screw shaft 38a with a pitch spacing that is ½ that of the screw vane 39b in the dewatering zone.

If the condensing zone and dewatering zone outer tubes 5a and 5b are formed cylindrically, and a coaxial screw shaft 37 is provided within the outer tube 5, as shown in FIG. 6, the screw press can also be used as a thickener, the processing capacity is increased, and the cost of fabrication is reduced.

TABLE 1

Comparison of Rotational Speeds of the Outer Tube and the Concentration and Dewatering Zones of the Screw Shaft

| Outer Tube Setting Conditions | Condensing zone | | Dewatering Zone |
|---|---|---|---|
| | Reverse Rotation | Reverse Rotation | |
| Pitch | $P_1 = P_2/2$ | $P_1 = P_2/3$ | $P_2$ |
| Screw shaft rotational speed $N_1$ | 1.0 | 1.0 | 1.0 |
| Outer tube rotational speed $N_2$ | −1.0 | −2.0 | 0 |
| Relative rotational speed $N = N_1 - N_2$ | 2.0 | 3.0 | 0 |
| Number of scraper sliding contacts | 2.0 | 3.0 | 1.0 |
| Dewatering zone supply amount Q | $Q_1 = P_2/2 \times 2 = P_2$ | $Q_1 = P_2/3 \times 3 = P_2$ | $Q_2 = P_2$ |

Transported quantity Q = Pitch P × Rotational speed N
Condensing zone Q1 = Dewatering zone Q2

Table 1 shows a comparison, for the case in which the condensing zone outer tube 5a is rotated in a direction opposite from the screw shaft 7, between the rotational speeds of the screw vane 6 and the condensing zone outer tube 5, with the pitch of the condensing zone screw vane 6a narrower than the pitch of the filtering and dewatering zone screw vane 6b.

As shown in FIG. 2, if the pitch P1 of the condensing zone screw vane 6 is ½ of the pitch P2 in the dewatering zone, assuming that the rpm of the screw haft 7 is N1=1 rpm and further that the rpm of the condensing zone outer tube 5a is N2=−1 rpm, the relative rpm N with respect to the screw shaft 7 is N=N1−N2=2 rpm, thereby doubling the number of sliding contacts of the scrapers on the screen 4a. The amount of concentrated sludge transported to the condensing zone Q1 is Q1=(P2/2)×2=P2, this being equal to the amount of sludge transported in the dewatering zone, so that the supply of sludge is balanced.

When the pitch P1 of the screw vane 6 is made ⅓ of the pitch P2 in the dewatering zone, if the reverse-direction rotational of the condensing zone outer tube 5a is made N2=−2 rpm, the relative rotational speed of the outer tube 5a is 3 rpm, thereby trebling the number of sliding contacts of the scrapers on the screen 4a, the amount of concentrated sludge transported to the condensing zone Q1 being equal to the amount of sludge Q2 transported in the dewatering zone.

Thus, if the relative rotational speed of the condensing zone outer tube 5a with respect to the screw shaft 7 is increased in proportion to the pitch of the screw vane 6 in the condensing zone, there is an increase in the number of sliding contacts of the condensing zone scrapers 33 with the screen 4a, thereby preventing clogging of the screen 4a, and the balance of the sludge supply is maintained.

Table 2 shows a comparison for the case in which, as shown in FIG. 5, a screw vane 6 is wound around the screw shaft 7 with a uniform pitch, between the rotational speeds of the screw vane 6 and the condensing zone outer tube 5a when the screw vane 6a is multiply wound around the screw shaft 7.

TABLE 2

Comparison of Rotational Speeds of the Outer Tube and the Concentration and Dewatering Zones of the Screw Shaft

| | Condensing zone | | | Dewatering Zone |
|---|---|---|---|---|
| | Reverse Rotation | Forward Rotation | Forward Rotation | |
| Screw vanes | Double | Double | Triple | Single |
| Pitch | $P_1 = P_2$ | $P_1 = P_2$ | $P_1 = P_2$ | $P_2$ |
| Screw shaft N1 | 1.0 | 1.0 | 1.0 | 1.0 |
| Outer tube rotational speed N2 | −0.5 | 2.0 | 2.0 | 0 |
| Relative rotational speed $N = N_1 - N_2$ | 1.5 | 1.0 | 1.0 | 1.0 |
| Number of scraper sliding contacts | 3.0 | 2.0 | 3.0 | 1.0 |
| Dewatering zone Supply amount Q | $Q1 = P_2 \times 1.5 = 1.5 P_2$ | $Q1 = P_2 \times 1 = P_2$ | $Q1 = P_2 \times = P_2$ | $Q1 = P_2$ |

Transported quantity Q = Pitch P × Rotational speed N
Condensing zone Q1 = Dewatering zone Q2

If the screw vane 6 in the condensing zone is doubly wound around the screw shaft 7 and the condensing zone outer tube 5a is rotated in the opposite direction from the screw vane 6, assuming a screw shaft 7 rotational speed P1 of 1 rpm and further assuming a condensing zone outer tube 5a rotational speed P2 of −0.5 rpm, the relative rotational speed N of the outer tube 5a with respect to the screw shaft 7 is N=N1−N2=1.5 rpm, and the number of sliding contacts of the scrapers 33 with the screen 4a is 1.5 rpm×2=3 (tripled).

The amount of sludge Q1 transported in the condensing zone and the filtering and dewatering zone is Q1=P2×1.5, this being 1.5 times the amount of transported sludge in the dewatering zone, so that if the condensing zone outer tube 5a is rotated in the direction opposite that of the screw vane 6, it is possible to maintain a balanced supply of sludge within an allowable limit.

If the condensing zone outer tube 5a is rotated in the same direction as the screw vane 6 and the screw vane 6 is doubly or triply wound around the screw shaft 7, assuming a screw shaft 7 rotational speed of P1 of 1 rpm and further assuming a condensing zone outer tube 5a rotational speed P2 of 2.0 rpm, the relative rotational speed N of the outer tube 5a with respect to the screw shaft 7 is N=N1−N2=1.0 rpm, so that the number of sliding contacts of the scrapers 33 with the screen 4a is 1.0 rpm×2=2 (double) for the case of a double screw vane 6, and 1.0 rpm×3=3 (tripled) for the case of a triple screw vane 6. The amount of sludge Q1 transported in the condensing zone is Q1=P2×1, this being equal to the amount of sludge Q2 transported in the filtering and dewatering zone, so that the balance of sludge supply is maintained.

Therefore, if the relative rotational speed of the condensing zone outer tube 5a is greater than the screw shaft 7, the number of sliding contacts of the scrapers 33 with the screen 4a is increased, thereby preventing clogging of the screen 4a.

As described above, if the relative rotational speed of the outer tube 5a is made greater than the screw shaft 7 and balance is maintained in the supply of sludge in the condensing zone and the dewatering zone, the number of sliding contacts of the scrapers 33 with the screen 4a increases, thereby causing renewal of the filtering surface of the screen 4a, so that even for a low-concentration sludge, in which the water load is greater than the solids load, it is possible to discharge a large amount of filtered fluid, without clogging of the screen 4a. Furthermore, not only is the clogging reduced, but also the number of cleanings is reduced as well.

Effects of the Invention

By adopting the above-described constitution, the present invention achieves a relative increase in the rotational speed of the screw vanes in the condensing zone, removing the cake layer deposited on the outer tube screen, which can cause clogging of the screen, thereby renewing the filter surface, this enabling an increase in the concentration of sludge transported to the filtering and dewatering zone. That is, whereas in an apparatus of the past continuous ejection of injection of cleaning water is performed as an outer tube at the sludge intake side is rotated, resulting in entry of the cleaning water into the outer tube, thereby not only halving the effectiveness of concentrating the sludge but also making it necessary to use a large amount of cleaning water, with the present invention a sludge supply path is provided in the screw shaft and a supply path supply hole is formed at the starting end of the condensing zone, so that the effect of the screw vane does not break up the soft concentrated sludge, thereby preserving the dewatering capacity.

Because a scraper makes pressured sliding contact with the inner peripheral surface of the outer tube, clogging of the screen is prevented over the entire region from the upstream region to the downstream region of the condensing zone to the downstream region, so that it is possible to discharge a large amount of filtered fluid without clogging of the screen of the condensing zone outer tube, even in the case of a low-concentration sludge having a large water load.

If the pitch of the screw vane in the condensing zone is made narrower than the pitch of the screw vane in the filtering and dewatering zone, and the condensing zone outer tube is rotated so as to maintain balance in the supply of sludge, the number of times the scraper makes a sliding contact with the screen is increased, thereby preventing clogging of the screen from occurring, increasing the effectiveness of concentration in the condensing zone, and enabling the movement of concentrated sludge to the filtering and dewatering zone.

If the condensing zone outer tube is rotated in the direction opposite of the direction of rotation of the screw shaft, the outer tube and screw vane move in mutually opposite directions, resulting in an increase in the number of sliding contacts of the scraper with the screen, an prevention of clogging of the screen.

If the screw vane in the condensing zone is multiply wound around the screw shaft, the number of sliding contacts of the scraper with the screen is increased, and the screen surface is renewed.

If the condensing zone outer tube and the screw shaft are rotated in one and the same direction, and the rotational speed of the outer tube is made higher than the rotational speed of the screw shaft, thereby maintaining the balance of sludge supply in the condensing zone and the filtering and dewatering zone, there is an increase in the number of sliding contacts of the scraper with the screen of the outer tube.

If the screw vane provided within the front half part of the outer tube is multiply wound around the screw shaft, the number of sliding contacts of the scraper with the screen is increased to the extent of the increase in number of screw vanes.

If the size of the minute holes in the screen applied to the outer tube in the condensing zone and in the screen in the dewatering zone is reduced from the upstream region toward the downstream region, as pressure applied to the sludge is gradually increased, the sludge does not flow out form the minute holes, and flows only out from the filter, thereby enhancing the cake reclaiming efficiency.

If the a relative reduction is made in the spacing between the outer tube and the screw shaft in the cake discharging direction, concentrated sludge, from which filtered fluid is separated at the condensing zone outer tube is gradually dewatered by the filtering and dewatering outer tube, thereby making possible a high degree cake dewatering.

If the condensing zone and dewatering zone outer tube is formed cylindrically and a cylindrical condensing zone screw shaft is provided coaxially therewithin, linked with a filtering and dewatering zone screw shaft that is tapered, with its diameter tapered from the upstream region toward the downstream region, the filter capacity of the condensing zone is increased, thereby making the present invention suitable for use with low-concentration sludge.

If a screw shaft is provided coaxially within a cylindrical outer tube, it is possible to use the present invention as a thickener, processing capacity is in increased, and the cost of fabrication is reduced.

Industrial Applicability

A single screw press according to the present invention, therefore, can perform concentration and dewatering, and features not only increased processing capability, but also a reduction in the cost of chemicals, since it is sufficient to perform concentration and dewatering with a single addition of a coagulant.

What is claimed is:

1. A screw press in which an outer tube, over which a screen is tensioned, is divided into a first portion in a freely rotatable condensing zone at a front half thereof, and a second portion in a filtering and dewatering zone at a rear half thereof, wherein the first portion of the outer tube is separate from, and rotatable relative to, the second portion of the outer tube, a freely rotatable screw shaft being provided within the divided outer tube, filtered fluid being separated from sludge supplied to a starting end of the condensing zone by the screen of the outer tube, and a cake being removed at a discharge port at a rear end of the filtering and dewatering zone, wherein a sludge supply path is provided in the screw shaft, a supply hole of the supply path being formed at the starting end of the condensing zone, and a scraper extending on an outer periphery of a screw vane from the starting end to the rear end, the scraper being caused to make pressured sliding contact with an inner peripheral surface of the outer tube, so that filtering and dewatering are performed as the first portion of the outer tube in the condensing zone and the screw shaft are rotated.

2. A screw press according to claim 1, wherein the screw vane wound around the screw shaft has a pitch in a screw vane in the condensing zone narrower than a pitch of a screw vane in the filtering and dewatering zone.

3. A screw press according to claim 1, wherein the screw vane is provided on the screw shaft with a single pitch, and wherein the screw vane is multiply wound around the screw shaft in the condensing zone.

4. A screw press according to claim 1, wherein the first portion of the outer tube in the condensing zone is caused to rotate in a direction opposite from the screw shaft.

5. A screw press according to claim 3, wherein the first portion of the outer tube in the condensing zone and screw shaft are rotated in one and the same direction, the rotational speed of the first portion of the outer tube in the condensing zone being higher than the speed of the screw shaft.

6. A screw press according to claim 1, wherein a plurality of screens are provided on the second portion of the outer tube in the filtering and dewatering zone, minute holes of the screens decreasing in diameter in a stepwise fashion from an upstream region toward a downstream region.

7. A screw press according to claim 1, wherein the first portion of the outer tube in the condensing zone and the second portion of the outer tube in the filtering and dewatering zone form a continuous cylindrical outer tube, a screw shaft having a taper with an increasing diameter from an upstream region toward a downstream region being provided within the outer tube.

8. A screw press according to claim 1, wherein the first portion of the outer tube in the condensing zone and the second portion of the outer tube in the filtering and dewatering zone are formed so as to be tapered, with a diameter being reduced from an upstream region toward a downstream region, a cylindrical screw shaft being provided within the outer tube.

9. A screw press according to claim 1, wherein the first portion of the outer tube in the condensing zone and the second portion of the outer tube in the filtering and dewatering zone are formed cylindrically, inside which a cylindrical condensing zone screw shaft and a tapered filtering and dewatering zone screw shaft, with a diameter increasing from an upstream region toward a downstream region, are linked.

10. A screw press according to claim 1, wherein the first portion of the outer tube in the condensing zone and the second portion of the outer tube in the filtering and dewatering zone are formed cylindrically, and wherein a screw shaft is disposed coaxially within the outer tube.

11. A screw press in which an outer tube, over which a screen is tensioned, is divided into a freely rotatable condensing zone at a front half thereof, and a filtering and dewatering zone at a rear half thereof, a freely rotatable screw shaft being provided within the divided outer tube, filtered fluid being separated from sludge supplied to a starting end of the condensing zone by the screen of the outer tube, and a cake being removed at a discharge port at a rear end of the outer tube of the filtering and dewatering zone, wherein a sludge supply path is provided in the screw shaft, a supply hole of the supply path being formed at the starting end of the outer tube of the condensing zone, and a scraper extending on an outer periphery of a screw vane from the starting end to the ending end, the scraper being caused to make pressured sliding contact with an inner peripheral surface of the outer tube, so that filtering and dewatering are performed as the outer tube of the condensing zone and the screw shaft are rotated, wherein the screw vane is provided on the screw shaft with a single pitch, and wherein the screw vane is multiply wound around the screw shaft in the condensing zone, and wherein the outer tube in the condensing zone and screw shaft are rotated in one and the same direction, the rotational speed of the outer tube in the condensing zone being higher than the speed of the screw shaft.

\* \* \* \* \*